Patented Sept. 1, 1942

2,294,405

UNITED STATES PATENT OFFICE 2,294,405

ALUMINUM BASE METAL COMPOSITION

Franz R. Hensel and Earl I. Larsen, Indianapolis, Ind., assignors to P. R. Mallory & Co., Inc., Indianapolis, Ind., a corporation of Delaware No Drawing. Application September 7, 1940, Serial No. 355,816

2 Claims. (Cl. 75—22)

This invention relates to a metallic composition, particularly useful for electrical contacting elements and electrical conductors.

It is an object of the invention to provide a material which will have long life when used as sliding contacts.

It is a further object of the invention to provide a new metallic composition and the combination of elements, the production of which heretofore has not been practicable.

Other objects of the invention will be apparent from the following description taken in connection with the appended claims.

The present invention comprises the combination of elements, methods of manufacture and the products thereof, brought out and exemplified in the disclosure hereinafter set forth, the scope of the invention being indicated in the appended claims.

While a preferred embodiment of the invention is described herein, it is contemplated that considerable variation may be made in the method of procedure and the combination of elements without departing from the spirit of the invention.

The invention contemplates the provision of a metallic body consisting of elements which have been impossible to alloy in the ranges of proportions contemplated by the present invention by the standard methods of the prior art. A new metallic composition comprises the combination of such elements as aluminum, graphite and cadmium.

The complete composition may contain the combined ingredients in the following approximate ranges of proportions, the percentages given in volume percent.

| | Percent |
|---|---|
| Aluminum or aluminum base alloy | 50-90 |
| Cadmium | 1-40 |
| Carbon | 1-40 |

It is possible to add a certain percentage of other ingredients to this new metal composition which will not materially influence the performance of the materials as electrical conducting or contacting elements. Beneficial results may occur when such metals as selenium and tellurium are added to the composition.

It is also possible to have a small percentage of silver present.

The most suitable form of carbon is graphite, since this imparts lubricating charactistics to the composition.

The selection of the exact composition to be used for any purpose will, of course, depend on the specific properties desired for the application contemplated. In other words, if the new materials are desired for a sliding contacting member, such as a commutator brush, it will be desirable to have a high percentage of graphite present, in order to improve the lubricating qualities of the new composition and still obtain all of the advantages which are gained by the combination of the elements aluminum, cadmium and carbon.

The compositions contemplated may be produced by mixing, pressing, and sintering the metal particles in the correct proportions desired for specific applications. This may, if desired, be followed by a repressing or coining operation.

Another method of manufacture which is suitable comprises pressing and sintering the mixed aluminum and carbon powders in a neutral or reducing atmosphere and subsequently heating the porous sintered bodies in contact with molten cadmium to impregnate them therewith. Added ingredients may be sintered with aluminum or added to the cadmium melt. The impregnated bodies may be further pressed if desired.

It is also possible to coat the aluminum particles with cadmium, or vice versa, and produce the desired compositions by mixing with the carbon, pressing and sintering. It is also to be understood that coining or cold working operations may be applied after completion of the sintering process.

The compositions of the invention may be backed by a solid metal backing of cuprous or ferrous base metal by pressing the composition directly onto the backing surface and sintering it thereon or by soldering the sintered body thereto. A backing may also be applied by pressing cuprous or ferrous metal powders directly against the composition of this invention and sintering the composite body thus produced, the backings afford a ready means for brazing the structure onto suitable supporting arms or surfaces. The backing may, in some cases, be provided with welding projections to enable attachment with a support by electric resistance welding, such as projection or percussion welding.

Materials of the type described have low specific gravity and may therefore be used to great advantage in motor constructions where weight saving is of great importance. Such is the case in the aircraft industry. In such instances, it may also be necessary to attach the aluminum base contacting material to a backing of a wrought or cast aluminum alloy which may be accomplished by means of special aluminum solders or by means of electric resistance welding, such as percussion welding.

While the present invention as to its objects and advantages has been described herein as carried out in specific embodiments thereof, it is not desired to be limited thereby, but it is intended to cover the invention broadly within the spirit and scope of the appended claims.

What is claimed is:

1. An aluminum-base metal composition containing as ingredients 1 to 40% cadmium, 1 to 40% carbon and 50 to 90% aluminum by volume, said ingredients being in finely divided form interspersed among one another and sinter-bonded together, said ingredients constituting substantially all of said composition.

2. An electric contacting element formed of an aluminum-base metal composition containing as ingredients 1 to 40% cadmium, 1 to 40% carbon and 50 to 90% aluminum by volume, said ingredients being in finely divided form interspersed among one another and sinter-bonded together, said ingredients constituting substantially all of said composition.

FRANZ R. HENSEL.
EARL I. LARSEN.